Figure 1:
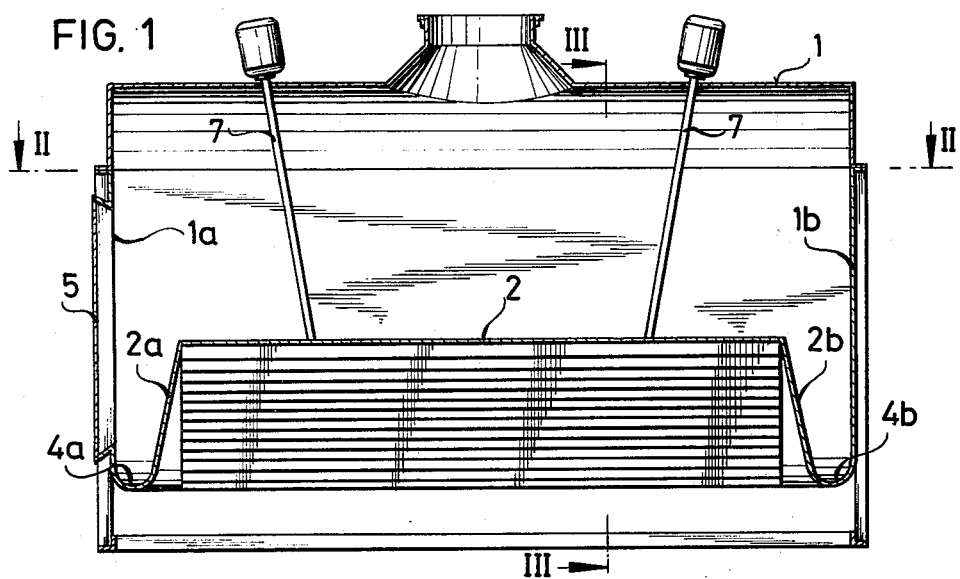

United States Patent [19]

Wolfseder

[11] 4,163,417
[45] Aug. 7, 1979

[54] MASH AND WORT TUB

[75] Inventor: Alfons Wolfseder, Freising, Fed. Rep. of Germany

[73] Assignee: Anton Steinecker Maschinenfabrik GmbH, Freising, Fed. Rep. of Germany

[21] Appl. No.: 818,148

[22] Filed: Jul. 22, 1977

[30] Foreign Application Priority Data

Jul. 23, 1976 [DE] Fed. Rep. of Germany ....... 2633281
Jun. 7, 1977 [DE] Fed. Rep. of Germany ....... 2725758

[51] Int. Cl.² ............................................. C12H 1/00
[52] U.S. Cl. .................................... 99/277.2; 99/348; 366/149

[58] Field of Search ................... 99/276, 277.2, 277.1, 99/348; 366/144, 146, 147, 149, 148; 220/DIG. 6

[56] References Cited

U.S. PATENT DOCUMENTS 2,586,133  2/1952  Wilken ............................... 99/277.2
3,791,630  2/1974  Hinds ................................. 366/144

Primary Examiner—Robert W. Jenkins
Attorney, Agent, or Firm—Jones, Thomas & Askew

[57] ABSTRACT

The invention relates to a mash and wort tub of rectangular cross-section, having heater bottom inclined upwardly from its edges in a roof-shaped manner.

11 Claims, 5 Drawing Figures

U.S. Patent  Aug. 7, 1979  Sheet 1 of 3  4,163,417

MASH AND WORT TUB

The mash and wort tubs employed for beer production have a circular or rectangular cross-section, according to design. Tubs having a rectangular cross-section generally feature a heater bottom that slopes inwards from the two longitudinal sides of the tub, whereby the deepest zone to the bottom is in many cases laterally offset with respect to the vertical longitudinal centre plane. Such an asymmetrical heater bottom provides a so-called "rolling boiling pattern" in which the wort rises in the neighborhood of the more steeply sloping bottom section and falls again in the zone adjacent to the bottom section that exhibits less slope.

Some mash and wort tubs are designed to have a circular cross-section with a bottom which is raised inwards. This produces "spouting boiling action" which considerably increases coagulation and vaporization.

The object of the invention is to construct a mash and wort tub of rectangular cross-section which will at the same time provide the advantages of "spouting boiling action."

This task is solved according to the invention by raising the heater bottom inwards from the two longitudinal sides of the tub in a roof-shaped manner.

This form of heater bottom—as illustrated by the exemplified embodiments of this invention—results in the wort spouting up to boil in the centre and then rolling outward on both sides to be drawn downwards again on reaching the longitudinal walls.

In a preferred embodiment of this invention, the heater bottom exhibits a lesser degree of slope with respect to the horizontal at the external region adjoining the two longitudinal sides that is the case in the adjoining inner region.

Hence it is possible, with a tub having the same external dimensions, to achieve an increase in the useful volume, an improvement in heating efficiency as well as particularly advantageous flow conditions.

Numerous additional preferred embodiments of the invention are the object of the sub-claims and are further elucidated in the specification with the aid of two exemplified embodiments.

The drawing depicts

Figure 2:
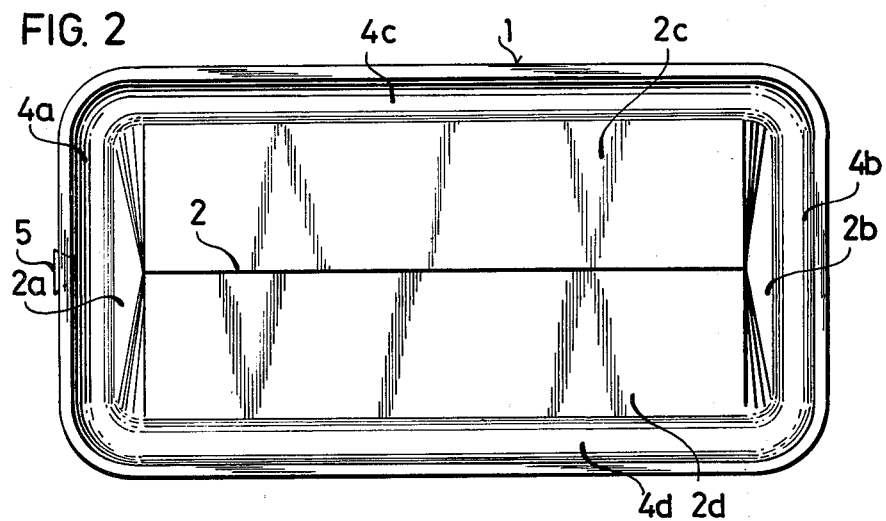
Figure 3:
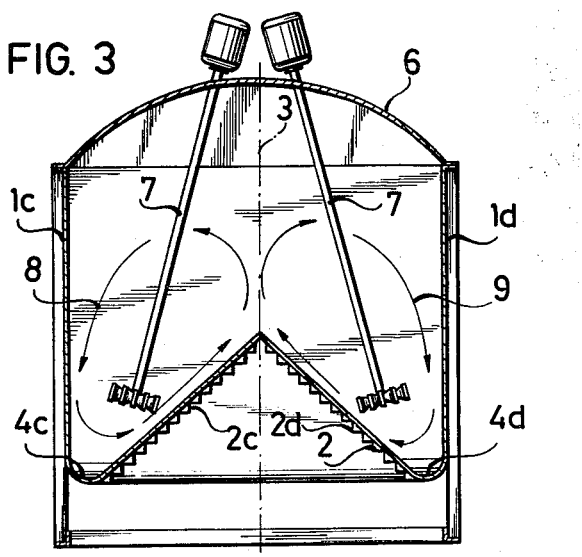
Figure 4:
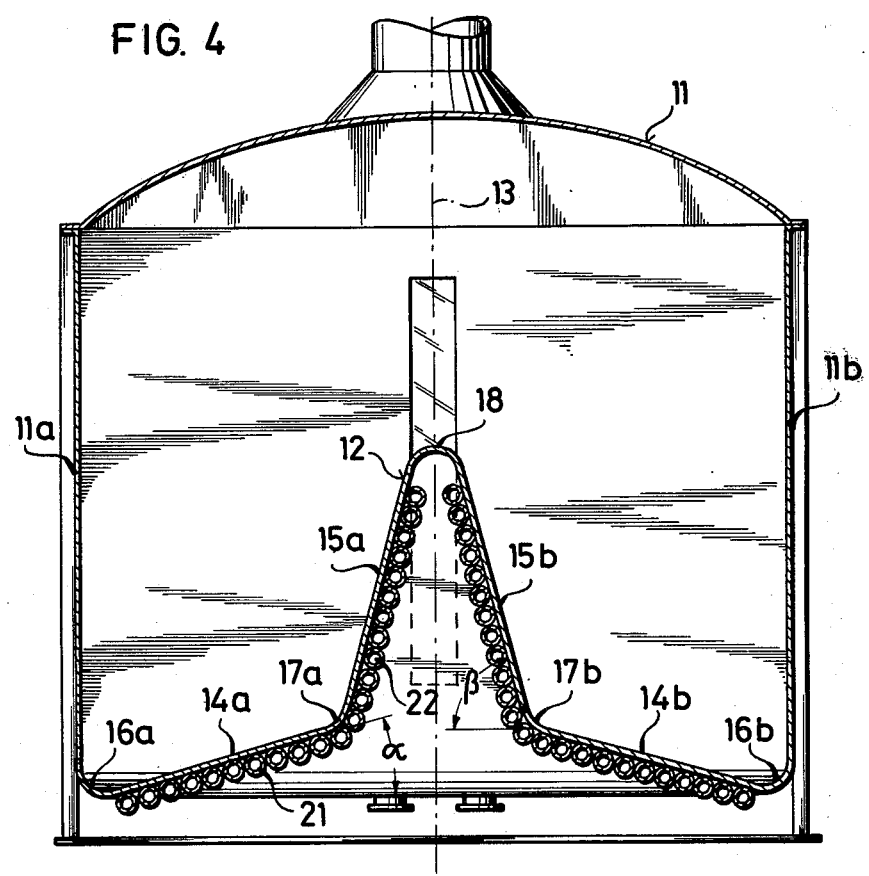
Figure 5:
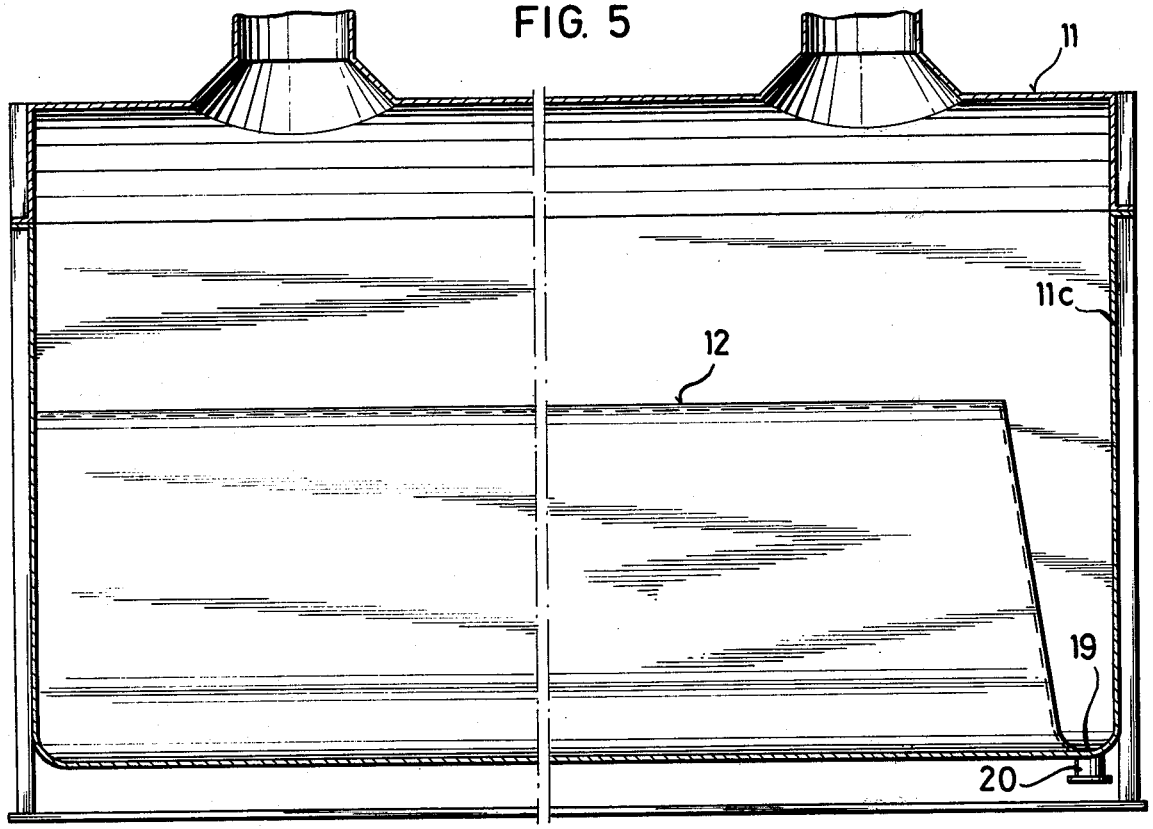

FIG. 1 a longitudinal section through the mash and wort tub, according to the first exemplified embodiment;

FIGS. 2 and 3 are section along the lines II—II and III—III, respectively, in FIG. 1;

FIG. 4 a cross-section of an additional exemplified embodiment of the invention;

FIG. 5 a longitudinal section of the tub in accordance with FIG. 4.

The mash and wort tub depicted in FIG. 1 to 3 has a rectangular cross-section and a heater bottom 2 which—as FIG. 3 in particular shows—is raised inwards from both longitudinal sides like a roof. Here the heater bottom 2 is symmetrical in shape with respect to the vertical longitudinal centre plane 3 of the tub 1 in the manner of an isoceles triangle.

In the proximity of the two end faces, the heater bottom 2 is inclined like a hip roof (refer to FIG. 1). The slope of these front walls, 2a, 2b, of heater bottom 2 is greater than that of the longitudinal walls 2c and 2d.

As the drawing makes apparent, heater bottom 2 passes over into the two front walls 1a and 1b of tub 1 via a synclinal trough in each case, 4l, 4b and into the two front walls 1c and 1d, respectively, via synclinal troughs 4a and 4b. These four synclinal troughs 4a, 4b, 4c and 4d are positioned at approximately the same level and constitute a coherent, integrated external channel which can appropriately feature a gradient to at least one outlet.

The passages between the longitudinal and front walls of the tub, as well as between the longitudinal and front walls of the synclinal heater bottom 2 are rounded at relatively large radii, as FIG. 2 makes particularly clear.

An upright inspection glass 5, which has a calibration bar, is located at the front wall 1a of tub 1.

Agitators 7 project from the top cover 6 into the interior of the tub. These agitators are inclined both in the longitudinal direction of the tub (refer to FIG. 1), as well as in the lateral direction of the tub (see FIG. 3).

Rotary flow of the wort sets in in both halves of the tub, determined by the shape of the heater bottom 2, as characterized by arrows 8 and 9 in FIG. 3. The wort spouts upwards to boil at the centre and rolls outwards on both sides until it is drawn down again in the proximity of the two longitudinal walls 1c and 1d. This rotary flow is assisted by the agitators 7 which at the same time bring about circulation in the longitudinal direction.

A uniform distribution of the wort is achieved when filling the tub by the surrounding, integral outer channel which surrounds the hip-roofed, raised bottom 2 on all sides. The height of the raised heater bottom is designed in such a manner that the bottom 2 is fully covered as soon as the first wort runnings have been run in and this facilitates rapid heating-up of the wort. For this purpose, the heater bottom can be controlled and regulated by a valve.

If the vessel is also used as a mash tub, then the heater bottom can be divided up into corresponding zones so that even small quantities of mash can be boiled.

Mash and wort tub 11, depicted in the drawing as a further exemplified embodiment of the invention, FIG. 4 and 5, has a rectangular cross-section and a heater bottom 12 that is raised in the manner of a roof from the longitudinal sides of the tub inwards. Here the heater bottom 12 comprises two halves which are positioned symmetrically with respect to the vertical longitudinal centre plane 13 of the tub. Each of these halves consists in the main of two flat heater bottom sections, 14a or 15a, or 14b or 15b respectively, with rounded passages 16a, 16b or 17a, 17b, or 18 positioned between the side walls 11a or 11b of the tub and heater-bottom sections 14a, 14b or between heater-bottom sections 15a and 15.

In the exemplified embodiment of the invention, the angle of inclination $d$ of the external heater-bottom sections 14a, 14b with respect to the horizontal is app. 15°; in accordance with the invention, this can lie between 8 and 30°, yet is preferably between 10° and 20°.

The angle of inclination $B$ of the inner heater-bottom sections 15a, 15b with respect to the horizontal amounts to app. 70° in the exemplified embodiment; in accordance with the invention, it can amount to between 50° and 80°, but preferably lies between 65° and 75°.

As is clearly illustrated in the longitudinal section in FIG. 4, the heater bottom 12 is hip-roof shaped in the proximity of the front side (front wall 11c of the tub) and here forms a synclinal discharge channel 19, the bottom of which lies at about the same level as the rounded passages 16a and 16b between side-walls 11a and 11b and the external heater-bottom sections 14a, 14b. An outlet 20 is also provided adjacent to the synclinal channel 19.

Appropriate heater units are provided on the lower side of the heater bottom (12). These can take the form of piping 21, 22, for example, through which a heating medium flows.

It can be seen that the graduated inclination of the heater bottom (a low degree to slope in the external field, and a greater angle of slope in the internal sphere) provides a larger heating area than that made available by a nongraduated, linear course; at the same time the useful volume of the tub is increased in the required manner.

Experiments have shown that such a heater bottom featuring different angle of inclination in the various fields produce very good flow conditions and an excellent "spouting-type boiling action".

It is also possible to attach agitators in this embodiment of the invention, however they are not absolutely necessary.

It would also be pointed out that embodiments of the invention are possible in which the angle of inclination of the heater bottom with respect to the horizontal can be increased continuously inwards from the external region adjoining the two longitudinal sides of the tub (use of a heater bottom with a convex base area adjacent to both cover top areas).

While this invention has been described in detail with particular reference to preferred embodiments thereof, it will be understood that variations and modifications can be effected within the spirit and scope of the invention as described hereinbefore and as defined in the appended claims.

I claim:

1. A mash and wort tub of approximately rectangular shape comprising a bottom wall and four approximately upright side walls, said bottom wall being inclined upwardly from adjacent opposite ones of the side walls toward the central portion of said tub, with the angle of incline increased at the central portion of said tub, and heating means for heating the inclined bottom wall from below said inclined bottom wall, whereby a spouting type boiling action is created in the liquid contained in the tub.

2. The tub of claim 1 and wherein said bottom wall is inclined upwardly from adjacent at least one of the others of said approximately upright sidewalls.

3. The tub of claim 1 and wherein the junction between the bottom wall and side wall comprises rounded troughs positioned at approximately the same level.

4. The tub of claim 1 characterized by said bottom wall comprising two halves symmetrically positioned with respect to each other, each of which includes two flat heater-bottom sections (14a, 15a) of different slopes joined by rounded sections (17a).

5. Mash and wort tub for heating beer and the like liquids comprising:
a tank with an approximately rectangular cross-section, said tank including two sidewalls, two end walls, and a bottom wall, said bottom wall being inclined upwardly from adjacent each said side walls toward the center portion of said tank, and said bottom wall being inclined inwardly and upwardly from adjacent at least one of said end walls, and means for heating said bottom wall to form a spouting-type boiling action in the liquid contained in the tub.

6. A tub according to claim 5 and wherein said opposing inclined portions of said bottom wall each include a constant angle of upward inclination.

7. Tub according to claim 5 and further comprising:
a tub top cover; and
agitators projecting into the interior of the tub from said tub cover, said agitators exhibiting a slope in the longitudinal direction of the tub, and a slope in the lateral direction of the tub.

8. A mash and wort tub of approximately rectangular shape for heating beer and the like liquids comprising:
two approximately parallel opposing side walls;
two approximately parallel opposing end walls; and
a bottom wall, said bottom wall including two opposing inclined portions positioned symmetrically about a vertical longitudinal center plane,
each said opposing inclined portion of said bottom all being inclined inwardly and upwardly from adjacent one of said opposing side walls,
said bottom wall further including at least one end inclined portion inclined inwardly and upwardly from adjacent one of said end walls to said two opposing inclined portions,
the junctions between said bottom wall and said side walls and said end walls comprising rounded troughs each positioned at approximately the same level, and
heating means for heating said bottom wall from below said bottom wall, whereby a spouting-type boiling action is created in the liquid contained in the tub.

9. A tub according to claim 8 and wherein each said lower flat section has a slope of between 8° and 30°, and preferably of between 10° and 20°, and each said upper flat section has an inclination of between 50° and 80°, and preferably between 65° and 75°, with respect to the horizontal.

10. The tub of claim 8 and wherein each of said opposing inclined portions of said bottom wall comprises:
a lower flat section adjacent one of said opposing side walls; and
an upper flat section positioned inwardly of said lower flat section;
said lower flat section being disposed at an angle of a lesser degree of inclination with respect to the horizontal than said upper flat section.

11. The tub of claim 8 and wherein said bottom wall further includes a second end inclined portion inclined inwardly and upwardly from adjacent the other of said end walls to said two opposing inclined portions.

* * * * *